(12) United States Patent
Wang et al.

(10) Patent No.: US 10,960,347 B1
(45) Date of Patent: Mar. 30, 2021

(54) WATER VAPOR HARVESTING MATERIALS AND DEVICES

(71) Applicant: KING ABDULLAH UNIVERSITY OF SCIENCE AND TECHNOLOGY, Thuwal (SA)

(72) Inventors: Peng Wang, Thuwal (SA); Renyuan Li, Thuwal (SA); Yifeng Shi, Thuwal (SA); Mengchun Wu, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 17/049,421

(22) PCT Filed: Apr. 3, 2019

(86) PCT No.: PCT/IB2019/052726
§ 371 (c)(1),
(2) Date: Oct. 21, 2020

(87) PCT Pub. No.: WO2019/220225
PCT Pub. Date: Nov. 21, 2019

Related U.S. Application Data

(60) Provisional application No. 62/795,691, filed on Jan. 23, 2019, provisional application No. 62/672,865, filed on May 17, 2018.

(51) Int. Cl.
B01D 53/02 (2006.01)
B01D 53/28 (2006.01)
(Continued)

(52) U.S. Cl.
CPC ........... B01D 53/28 (2013.01); B01D 5/0057 (2013.01); B01D 53/06 (2013.01); B01D 53/261 (2013.01);
(Continued)

(58) Field of Classification Search
CPC .... B01D 53/28; B01D 53/0057; B01D 53/06; B01D 53/261; B01D 2253/112;
(Continued)

(56) References Cited

U.S. PATENT DOCUMENTS 4,345,917 A * 8/1982 Hussmann ................ E03B 3/28
95/125
4,391,616 A * 7/1983 Imamura .................. B01J 20/20
95/92
(Continued)

FOREIGN PATENT DOCUMENTS

DE 102010047788 A1 4/2012
EP 2765156 A1 8/2014

OTHER PUBLICATIONS

Cui, S., et al., "Fast Superabsorbent Thermo-Responsive Hydrogel Composite Desiccant with Low Regeneration Temperature," 2018, DOI: 10.1002.
(Continued)

Primary Examiner — Christopher P Jones
(74) Attorney, Agent, or Firm — Patent Portfolio Builders PLLC

(57) ABSTRACT

An atmospheric water harvesting material includes a deliquescent salt, a photothermal agent, and a polymeric hydrogel matrix containing the deliquescent salt and photothermal agent.

19 Claims, 9 Drawing Sheets

(51) Int. Cl.
*B01D 53/06* (2006.01)
*B01D 5/00* (2006.01)
*C08J 3/075* (2006.01)
*B01J 20/02* (2006.01)
*B01J 20/04* (2006.01)
*B01J 20/28* (2006.01)
*B01J 20/32* (2006.01)
*E03B 3/28* (2006.01)
*B01D 53/26* (2006.01)

(52) U.S. Cl.
CPC ....... *B01J 20/0222* (2013.01); *B01J 20/0225* (2013.01); *B01J 20/0229* (2013.01); *B01J 20/0237* (2013.01); *B01J 20/0244* (2013.01); *B01J 20/0288* (2013.01); *B01J 20/0296* (2013.01); *B01J 20/046* (2013.01); *B01J 20/28026* (2013.01); *B01J 20/321* (2013.01); *B01J 20/3208* (2013.01); *C08J 3/075* (2013.01); *E03B 3/28* (2013.01); *B01D 2253/112* (2013.01); *B01D 2253/202* (2013.01); *B01D 2253/25* (2013.01); *B01D 2257/80* (2013.01); *B01D 2259/40098* (2013.01); *C08J 2333/26* (2013.01)

(58) Field of Classification Search
CPC .......... B01D 2253/202; B01D 2253/25; B01D 2257/80; B01D 2259/40098; B01J 20/0222; B01J 20/0225; B01J 20/0229; B01J 20/0237; B01J 20/0244; B01J 20/0288; B01J 20/0296; B01J 20/046; B01J 20/28026; B01J 20/3208; B01J 20/321; C08J 3/075; C08J 2333/26; E03B 3/28
See application file for complete search history.

(56) References Cited

U.S. PATENT DOCUMENTS

| 2012/0003316 | A1* | 1/2012 | Reddy | A61K 31/135 424/487 |
| 2013/0230496 | A1* | 9/2013 | Mohapatra | C08F 251/00 424/93.7 |
| 2015/0020687 | A1 | 1/2015 | Alkhazraji et al. | |
| 2018/0171604 | A1* | 6/2018 | Kim | B01D 5/0003 |

OTHER PUBLICATIONS

International Search Report in corresponding/related International Application No. PCT/IB2019/052726, dated Sep. 4, 2019.

Kim, H., et al., "Adsorption-Based Atmospheric Water Harvesting Device for Arid Climates," Nature Communications, Mar. 22, 2018, vol. 9, Article No. 1191, pp. 1-8.

Kim, H., et al., "Water Harvesting from Air with Metal-Organic Frameworks Powered by Natural Sunlight," Science, Apr. 28, 2017, vol. 356, pp. 430-434.

Li, R., et al., "Harvesting Water from Air: Using Anhydrous Salt with Sunlight," Environmental Science & Technology, Oct. 2, 2018, vol. 52, No. 19, pp. 5398-5406.

Li, R., et al., "Hybrid Hydrogel with High Water Vapor Harvesting Capacity for Depolyable Solar-Driven Atmospheric Water Generator," Environmental Science & Technology, Oct. 2, 2018, vol. 52, No. 19, pp. 11367-11377.

Written Opinion of the International Searching Authority in corresponding/related International Application No. PCT/IB2019/052726, dated Sep. 4, 2019.

Yang, Y., et al., "Development of Solid Super Desiccants Based on Polymeric Superabsorbent Hydrogel Composite," RSC Advances, Jun. 24, 2015, Issue 73, pp. 1-7, RCS Publishing.

* cited by examiner

WATER VAPOR HARVESTING MATERIALS AND DEVICES

CROSS-REFERENCE TO RELATED APPLICATIONS

This application is a U.S. National Stage Application of International Application No. PCT/IB2019/052726, filed on Apr. 3, 2019, which claims priority to U.S. Provisional Patent Application No. 62/672,865, filed on May 17, 2018, entitled "MATERIALS FOR SOLAR-ASSISTED ATMOSPHERIC WATER HARVESTING FOR FRESH WATER PRODUCTION," and U.S. Provisional Patent Application No. 62/795,691, filed on Jan. 23, 2019, entitled "A SORPTION-BASED CONTINUOUS ATMOSPHERIC WATER GENERATOR (AWG) DEVICE," the disclosures of which are incorporated herein by reference in their entirety.

BACKGROUND

Technical Field

Embodiments of the subject matter disclosed herein generally relate to a device, materials, and method for harvesting atmospheric water vapor using a polymeric hydrogel that includes a deliquescent salt and a photothermal agent.

Discussion of the Background

Water is essential for life on this planet. Many regions of the world, however, do not have ready access to water. Further, even regions that have access to water, the available water may not be suitable for human consumption. For example, the available water may be salinated water from the ocean, which contains too much sodium for consumption in the amounts required to sustain human life.

One readily-available source of water is the Earth's atmosphere, which is accessible almost anywhere on Earth and holds approximately 12,900 billion tons of fresh water. Thus, there has been considerable research into capturing atmospheric water vapor to provide clean water for arid regions, land-locked regions, and remote communities. The most promising conventional atmospheric water harvesting devices employ a water sorbent to capture atmospheric water vapor and solar energy to release the captured atmospheric water vapor for consumption. The use of solar energy to release the captured atmospheric water is advantageous because the device does not require an external power source to desorb the captured atmospheric water from the water sorbent.

In order to be cost-effective and encourage wide-spread adoption, an atmospheric water harvesting device should include a water sorbent capable of adsorbing large amounts of water from the air, even in relatively low humidity conditions, and capable of releasing the adsorbed water under relatively low temperatures. Conventional desiccants, such as silica gel, zeolite, activated alumina, typically have wide water vapor sorption window, but to efficiently release the captured water, they require high temperatures (>160° C.), which are typically beyond what simple solar photothermal based heating devices are capable of offering.

Document [1] discloses solid super desiccants formed from a sodium polyacrylate powder with a lithium chloride solution. The desiccants can be regenerated, i.e., the absorbed water can be released, at temperatures less than 80° C. Although Document [1] does not disclose how much lower than 80° C. the desiccants can be regenerated, heating the super desiccants to approximately 80° C. using solar radiation would require very strong sun rays. Thus, the solution disclosed in Document [1] can produce water only under limited environmental conditions.

Document [2] discloses a hydrogel composite desiccant composed of porous Poly(N-isopropylacrylamide) impregnated by hygroscopic salt in the form of calcium chloride ($CaCl_2$). Specifically, the calcium chloride is impregnated in a thermo-responsive polymer matrix-double network Alginate/PNIPPAm hydrogel. The hydrogel composite desiccant is a thermo-responsive polymer, which is a temperature-induced phase transfer material. When the temperature is low, the polymer exhibits hydrophilic wetting behavior in which water can be absorbed into the crosslink structure. When the temperature is higher than certain value (known as the lower critical solution temperature, LOST), the polymer converts into hydrophobic wetting behavior in which the polymer chain will shrink and extrude water.

Because PNIPAAm is an electrostatically crosslinked hydrogel, the ion strength (i.e., concentration of salt solution) of infiltrated solution will significantly influence its phase-conversion property, which appears to be the reason why Document [2] discloses that very limited salt can be loaded into the hydrogel.

One problem with the hydrogel disclosed in Document [2] is that it requires a heat source that is sufficient to raise the temperature of the hydrogel so that it converts to a hydrophobic phase. This typically involves a heat source that burns fossil fuels, thus requiring additional fossil fuel energy input to convert water vapor into water.

Another problem with the hydrogel disclosed in Document [2] relates to its water release process. When the temperature is higher than LOST, the polymer chain/crosslink will shrink due to the conversion of hydrophilicity to hydrophobicity. Thus, water is "left behind" at its original position. This process will lead to a serious salt wash out and the hygroscopic, as well as other impurities precipitated from the hydrogel, will contaminate the collected water. Further, the wash out of salt will lead to a decrease of water sorption property of sorbent, and accordingly, requires occasional addition of salt to the hydrogel to maintain its water absorption properties.

Thus, there is a need for an atmospheric water harvesting material that is able to absorb large amounts of atmospheric water vapor and to safely desorb the atmospheric water vapor under relatively low temperatures without requiring a fossil fuel heating source and/or that can produce pure water instead of salt contaminated water.

SUMMARY

According to an embodiment, there is an atmospheric water harvesting material, which includes a deliquescent salt, a photothermal agent, and a polymeric hydrogel matrix containing the deliquescent salt and photothermal agent.

According to another embodiment, there is a method for forming an atmospheric water harvesting material. A polymeric hydrogel matrix comprising a photothermal agent is formed. The polymeric hydrogel matrix comprising the photothermal agent is then freeze-dried. The freeze-dried polymeric hydrogel matrix comprising the photothermal agent is immersed in a solution containing deliquescent salt to form a polymeric hydrogel matrix comprising the photothermal agent and the deliquescent salt. The polymeric hydrogel matrix comprising the photothermal agent and the deliquescent salt is then dried.

According to a further embodiment, there is an atmospheric water harvesting device, which includes a condensation chamber having a light admitting upper surface and a water outlet. The device also includes an atmospheric water harvesting chamber, arranged below the condensation chamber, containing an atmospheric water harvesting material and having a bottom surface with an opening to accept ambient air and an upper surface having an opening to allow atmospheric water captured from the ambient air by the atmospheric water harvesting material to pass into the condensation chamber due to heat generated from solar energy impinging on the light admitting upper surface of the condensation chamber.

According to another embodiment, there is a method for generating water from water vapor. Water vapor is absorbed by an atmospheric water harvesting material arranged on an outer surface of a cylinder. The atmospheric water harvesting material includes a deliquescent salt, a photothermal agent, and a polymeric hydrogel matrix containing the deliquescent salt and photothermal agent. The cylinder is rotated so that a portion of the atmospheric water harvesting material that has absorbed the water vapor is facing a condensation chamber, which is arranged above the cylinder and has a light-admitting upper surface. The portion of the atmospheric water harvesting material facing the condensation chamber is exposed to solar energy passing through the light-admitting upper surface. The water vapor from the portion of the atmospheric water harvesting material facing the condensation chamber is released into the condensation chamber due to the solar energy. The released water vapor is condensed into water in the condensation chamber. The condensed water is pure water or the water vapor is released exclusively due to the solar energy.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of atmospheric water harvesting for production of water. It should be recognized, however, that the embodiments can also be employed in connection other uses of atmospheric water harvesting, including dehumidification, desiccant-assisted cooling, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
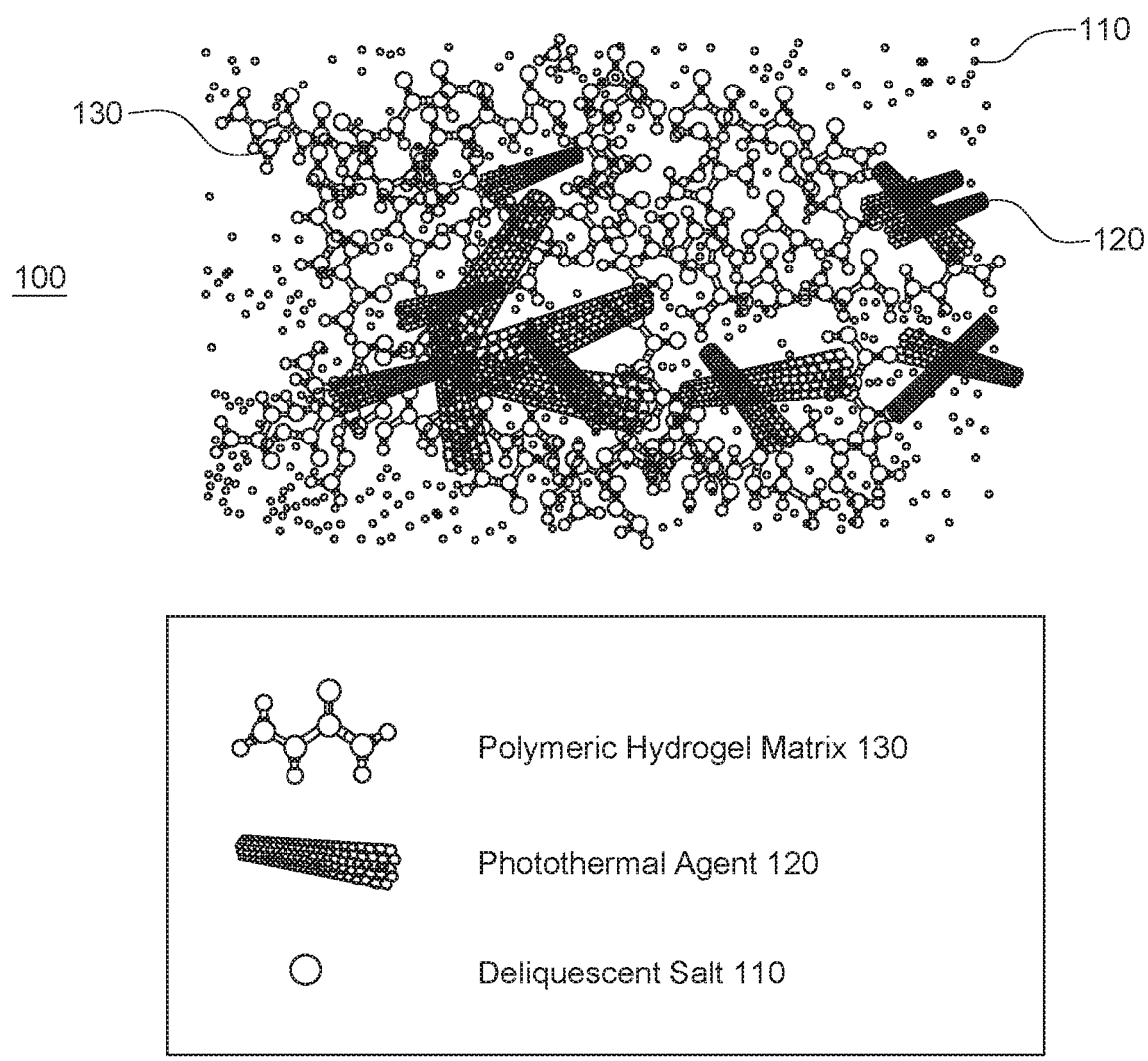
FIG. 1 is a diagram of an atmospheric water harvesting material according to embodiments.

FIG. 1 is a diagram illustrating an atmospheric water harvesting material 100. The atmospheric water harvesting material includes a deliquescent salt 110, a photothermal agent 120, and a polymeric hydrogel matrix 130 containing the deliquescent salt 110 and photothermal agent 120. The deliquescent salt 110 is in a liquid phase but is held in a solid form in the polymeric hydrogel matrix 130. The polymeric hydrogel matrix 130 comprises a cross-linked and flexible hydrogel network. Those skilled in the art will appreciate that a photothermal agent is one that produces thermal energy in the form of heat due to photoexcitation of the agent.

The disclosed atmospheric water harvesting material is particularly advantageous because it is not sensitive to the ion strength of infiltrated solution, which allows it to hold more hygroscopic salt and thus exhibits a higher water capacity compared to conventional materials, such as those disclosed in Document [2]. Specifically, the disclosed atmospheric water harvesting material releases water while exhibiting a hydrophilic phase and does not require conversion to a hydrophobic phase that can exhibit salt wash out. Thus, compared to the material disclosed in Document [2], the disclosed atmospheric water harvesting material shows better durability, as well as the ability to produce pure water instead of water contaminated by salt that requires further treatment. Accordingly, the disclosed atmospheric water harvesting material can produce potable water (i.e., distilled water) from atmospheric water vapor without requiring additional, complicated post-treatment.

The inclusion of a photothermal agent in the atmospheric water harvesting material allows the atmospheric water harvesting material to generate heat under natural sunlight, which causes the atmospheric water harvesting material to heat up and evaporate out the absorbed water vapor. Thus, the disclosed atmospheric water harvesting material can release water exclusively due to solar energy (i.e., it is self-heating) and does not require electricity or other heat sources that may require consumption of fossil fuels.

In the illustrated embodiment, the deliquescent salt 110 is calcium chloride ($CaCl_2$). However, the deliquescent salt 110 can be one or more of the following:

|  | Chemical formula | IUPAC Name |
| --- | --- | --- |
| Chloride salt | LiCl | Lithium chloride |
|  | $MgCl_2$ | Magnesium chloride |
|  | $ZnCl_2$ | Zinc chloride |
|  | $FeCl_3$ | Iron (III) chloride |
| Nitrate salt | $Zn(NO_3)_2$ | Zinc nitrate |
|  | $Cu(NO_3)_2$ | Copper (II) nitrate |
|  | $Ni(NO_3)_2$ | Nickel (II) nitrate |
|  | $Mn(NO_3)_2$ | Manganese (II) nitrate |

In the illustrated embodiment, the photothermal agent 120 comprises carbon nanotubes (CNTs). However, the photothermal agent 120 can be one or more of the following:

| Material | Composition |
| --- | --- |
| Carbon black | Carbon material |
| Graphite | |
| Graphene | |
| Graphene oxide (GO) | |
| Reduced Graphene oxide (rGO) | |
| MXene (i.e., $Ti_3C_2$, $Ti_3CN$, $Ti_4N_3$, $Mo_2TiC_2$, etc.) | 2-D structured Metal carbide, metal nitride |
| Black phosphorous | Phosphorous |
| Black titanium oxide | Titanium oxide |
| Nanorods | Metal (i.e., Al, Ag, Au, etc.) |
| Nanoparticles | Metal (i.e., Al, Ag, Au, etc.) |
| Nanowire | Metal (i.e., Al, Ag, Au, etc.) |
| Ferrous ferric oxide | Iron oxide |
| polypyrrole | polymer |
| dopamine | polymer |
| Metal oxides | $CuO$, $MnO_2$, $CuCr_2O_4$, $Fe_2O_3$, $Fe_3O_4$, etc. |

In the illustrated embodiment, the polymeric hydrogel matrix 130 is a poly(acrylamide) (PAM) hydrogel. However, the polymeric hydrogel matrix 130 can be comprised of one or more of the following polymers:

| Polymer | Abbreviation |
| --- | --- |
| Poly(acrylic acid) | PAA |
| Poly(vinyl pyrrolidone) | PVP |
| Poly(acrylamide) | PAM |
| Poly(ethylene oxide) | PEO |
| Poly(vinyl methyl ether) | PVME |
| Poly(vinyl alcohol) | PVA |
| Hydroxypropylcellulose | HPC |
| Hydroxyethylcellulose | HEC |
| Poly(2-hydroxyethyl vinyl ether) | PHEVE |
| Poly(N-isopropylacrylamide) | PNIPAM |

Figure 2:
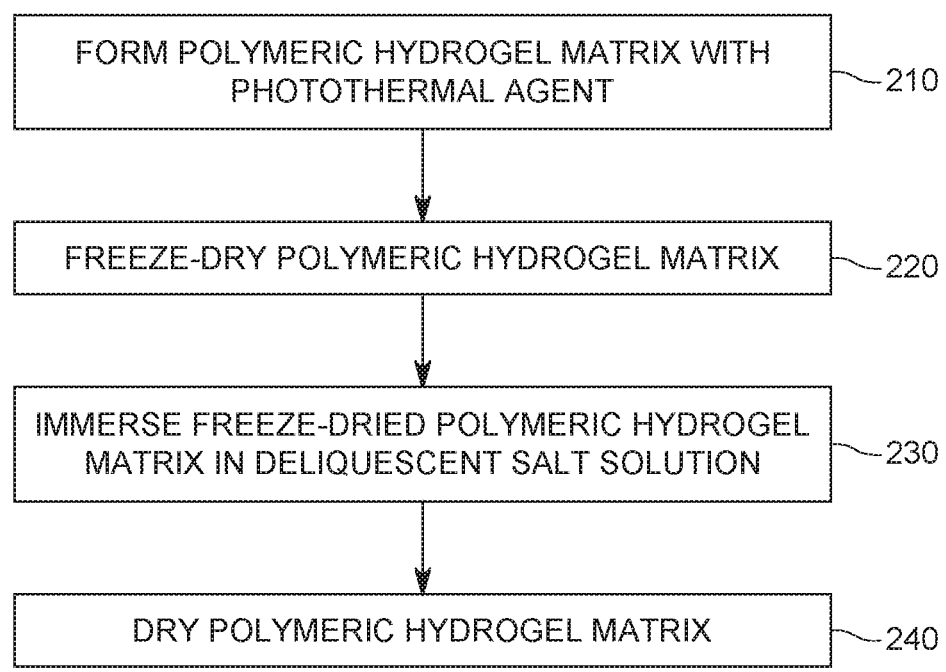
FIG. 2 is a flow diagram of a method for making an atmospheric water harvesting material according to embodiments.

A method of making an atmospheric water harvesting material will now be described in connection with the flowchart of FIG. 2 and the diagrams of FIGS. 3A-3E. Although this method is described with calcium chloride as the deliquescent salt, carbon nanotubes as the photothermal agent, and poly(acrylamide) (PAM) hydrogel as the hydrogel matrix, this method can employ any of the deliquescent salts, photothermal agents, and hydrogel matrices described above.

Figure 3A:
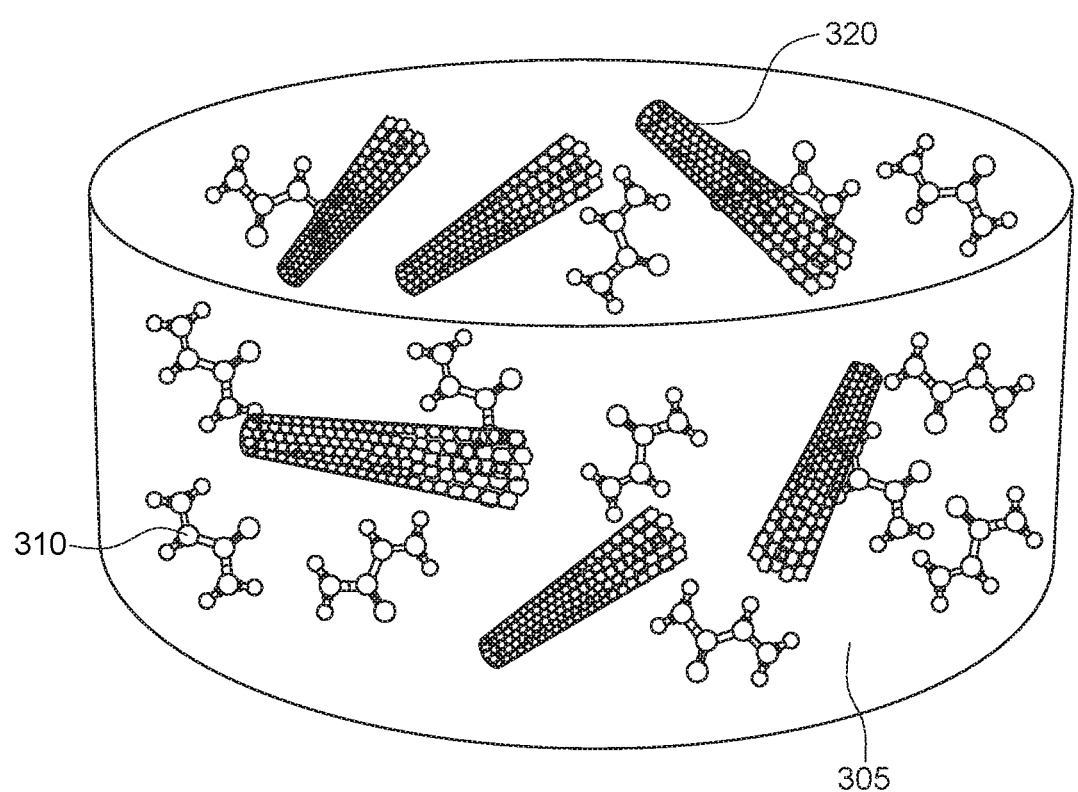
FIGS. 3A-3E are diagrams of the making of an atmospheric water harvesting material according to embodiments.

Initially, a polymeric hydrogel matrix comprising a photothermal agent is formed (step 210). Specifically, the carbon nanotubes are initially pretreated by dispersing, for example, 6.0 g of carbon nanotubes having a size of, for example, 6-9 nm×5 μm, in a mixture of, for example, 70% nitric acid (60 mL) and 97% sulfuric acid (180 mL). The dispersion was then refluxed for 4 hours at 70° C. followed by 2 hours of sonication. The as-treated dispersion can then be filtrated and thoroughly washed by deionized water before insertion into the hydrogel matrix. The hydrogel matrix is formed by dissolving, for example, 1.0 gram of acrylamide (AM) in, for example, 5 ml of the carbon nanotube dispersion with a specified amount of carbon nanotubes added (e.g., 2.5, 1.25, 0.5, 0.375, 0.25, 0.125, 0.05, 0.025 mg). The acrylamide-carbon nanotube dispersion is then purged with nitrogen to eliminate dissolved oxygen. The results of this is illustrated in FIG. 3A, which illustrates acrylamide 310 and carbon nanotubes 320 suspended in deionized water 305.

Figure 3B:
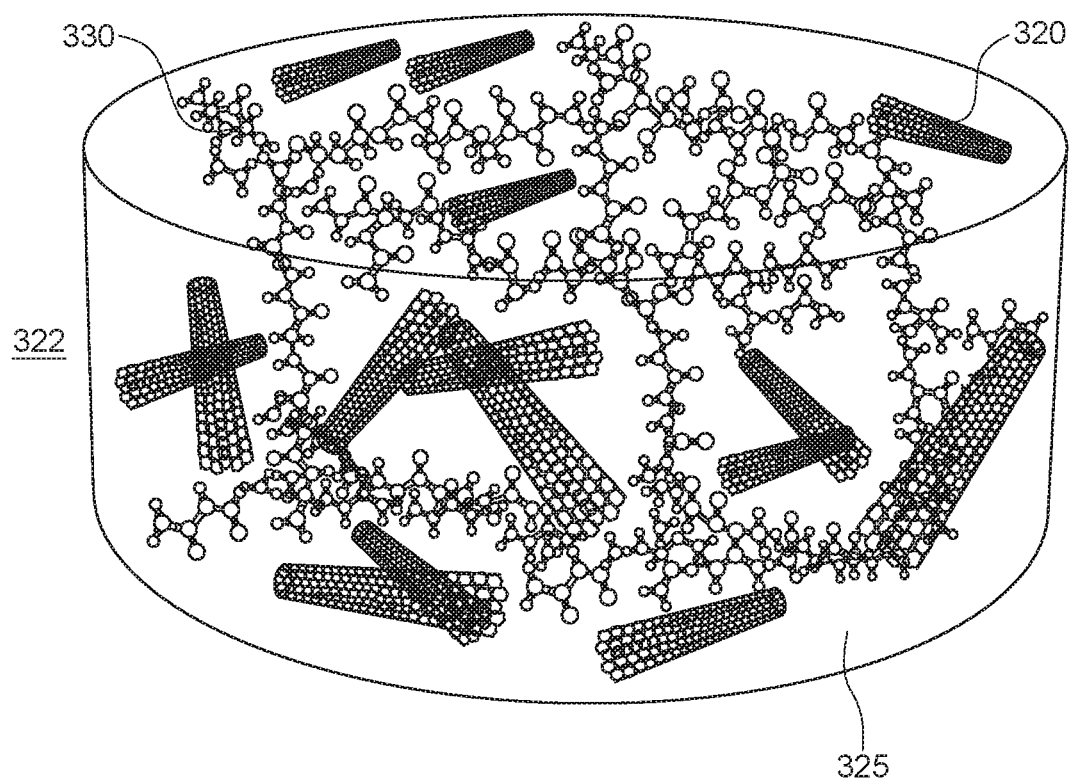

An initiator, for example 5.00 mg of potassium peroxydisulfate (KPS), and a hydrogelling agent, for example 0.38 mg of N,N'-Methylenebis(acrylamide) (MBAA), are added into the acrylamide-carbon nanotube dispersion. A hydrogelling accelerator, for example, 25 μL of tetramethylethylenediamine (TEMED) is then added and the mixture is allowed to settle overnight at a temperature of, for example, 22° C. The resulting poly(acrylamide) (PAM)-carbon nanotube hydrogel matrix 322 is illustrated in FIG. 3B, in which the hydrogel is labeled as element 325 and the poly(acrylamide) is labeled as element 330.

Figure 3C:
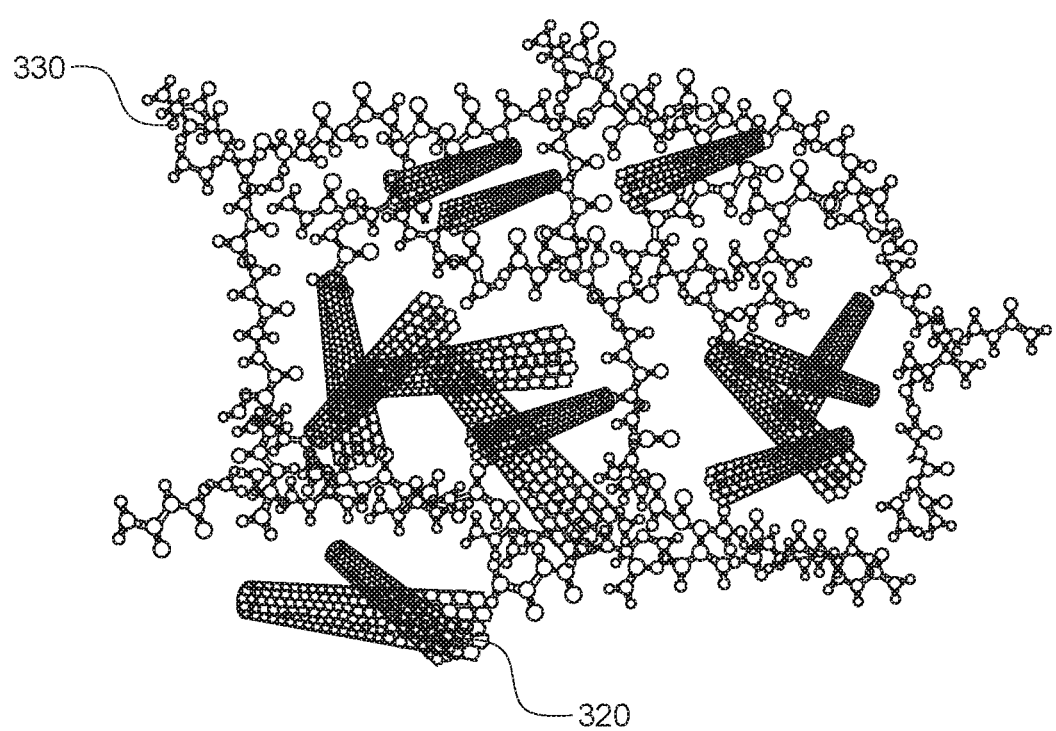

The polymeric hydrogel matrix comprising the photothermal agent is then freeze-dried to make the hydrogel into a microporous hydrogel (step 220). The polymeric hydrogel matrix can be freeze-dried at, for example, −80° C. The resulting microporous hydrogel is illustrated in FIG. 3C.

Figure 3D:
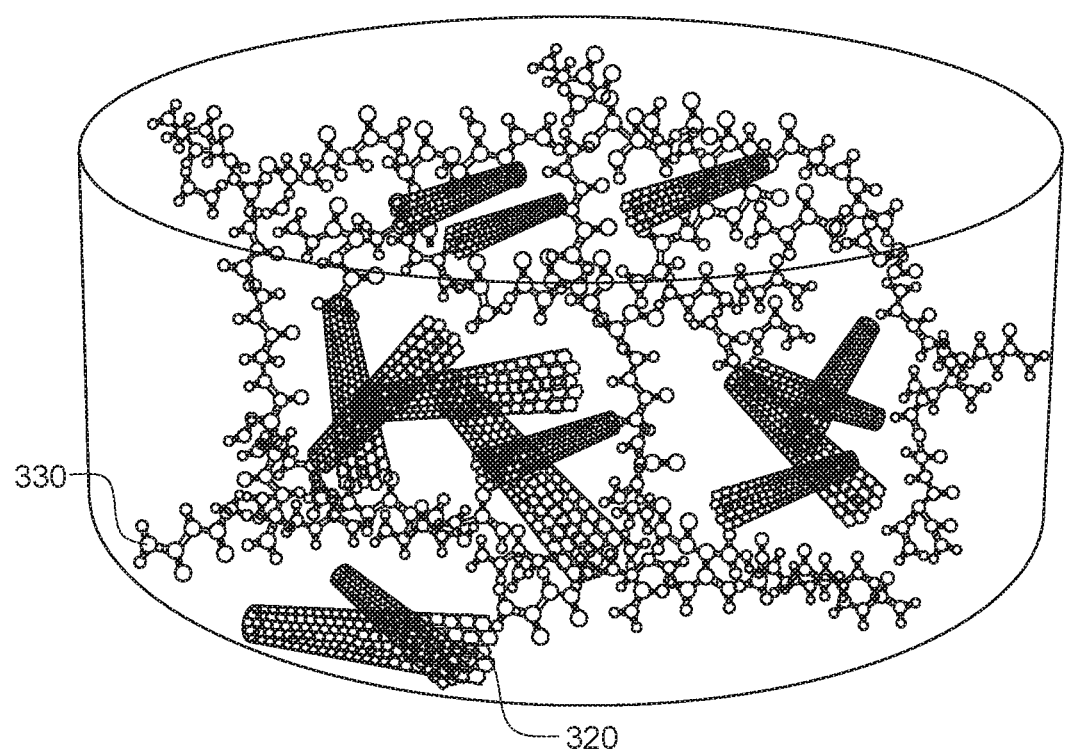

The freeze-dried polymeric hydrogel matrix comprising the photothermal agent is then immersed in a solution containing deliquescent salt to form a polymeric hydrogel matrix comprising the photothermal agent and the deliquescent salt (step 230). For example, the freeze-dried hydrogel can be immersed in, for example, 10 ml of a calcium chloride solution for, for example, 24 hours. The drying can occur under ambient conditions, for example, 60% relative humidity and 22° C. Experiments were performed using calcium chloride concentrations of 0.1, 0.2, 0.3, 0.4, 0.5, and 0.6 g/mL for 24 hours under ambient condition, for example, 60% relative humidity and 22° C. Based on experimentation, the highest loading of calcium chloride and the highest water vapor sorption capacity occurred with a calcium chloride concentration of 0.4 g/mL. The resulting hydrogel is illustrated in FIG. 3D, in which the calcium chloride is not visible because it is suspended in the solution.

Figure 3E:
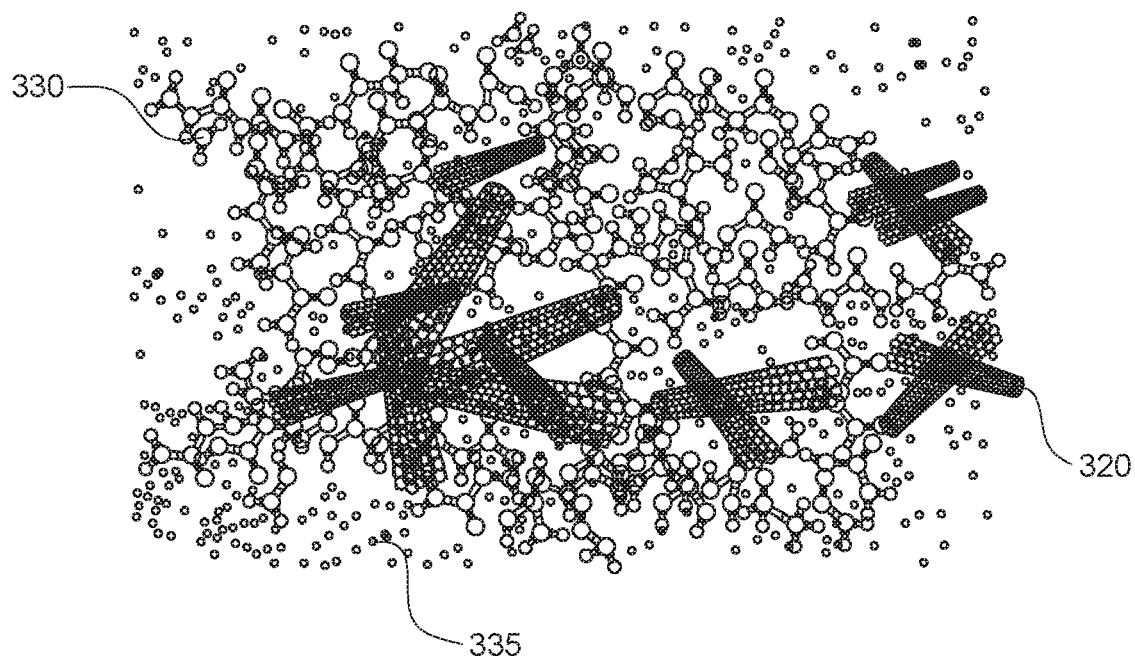

Finally, the polymeric hydrogel matrix comprising the photothermal agent and the deliquescent salt is dried (step 240). For example, the poly(acrylamide)-carbon nanotube-calcium chloride hydrogel can be dried at 80° C. in a blast oven for three days. The resulting hydrogel, which is referred to herein as an atmospheric water harvesting material, is illustrated in FIG. 3E, in which the calcium chloride is labeled as element 335.

Figure 4:
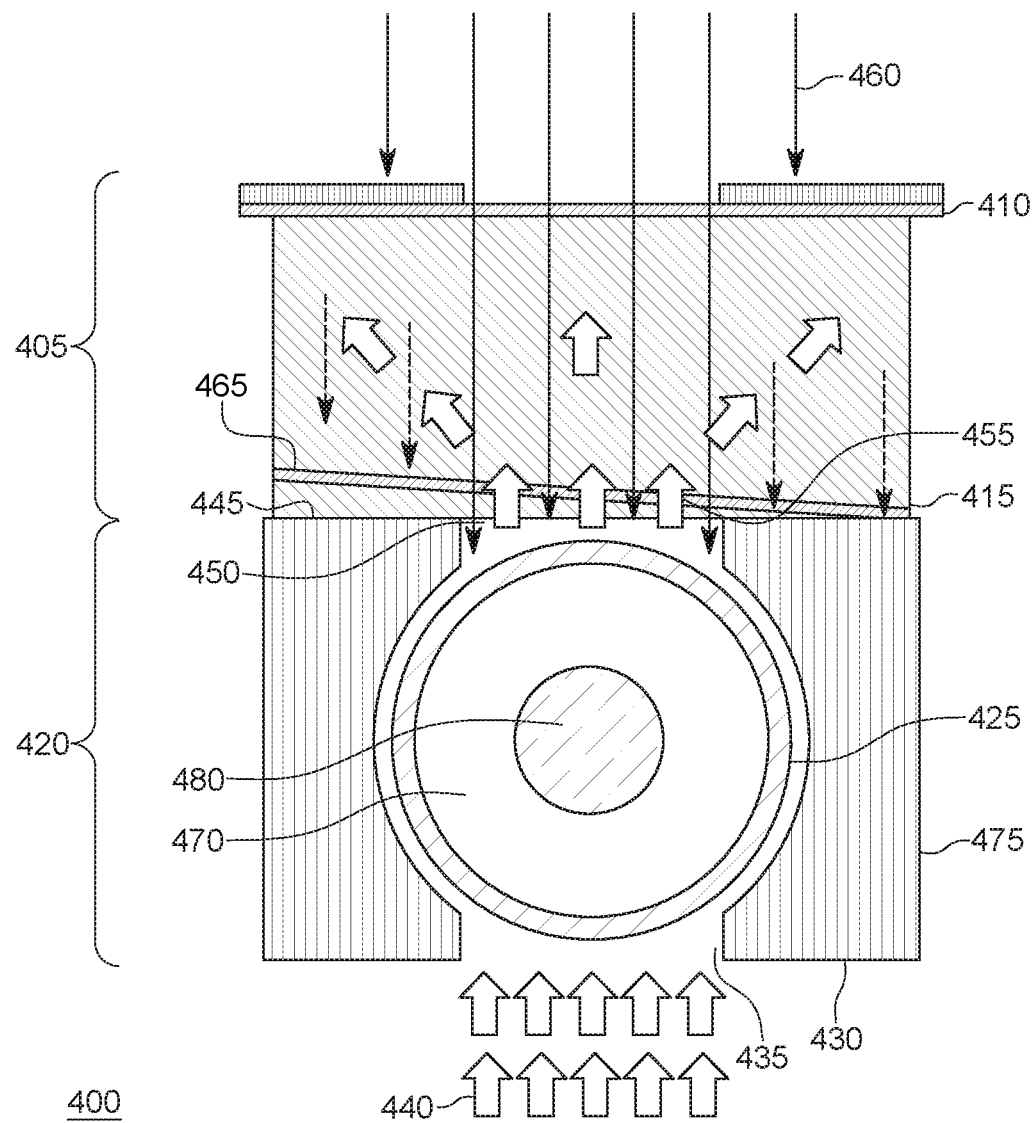
FIG. 4 is a diagram of an atmospheric water harvesting device according to embodiments.

The disclosed atmospheric water harvesting material can be employed in any type of water harvesting device, one example of which is illustrated in FIG. 4. The atmospheric water harvesting device 400 includes a condensation chamber 405 having a light-admitting upper surface 410 and a water outlet 415. The atmospheric water harvesting device 400 also includes an atmospheric water harvesting chamber 420, arranged below the condensation chamber 405, containing an atmospheric water harvesting material 425 and having a bottom surface 430 with an opening 435 to accept ambient air 440 and an upper surface 445 having an opening 450 to allow atmospheric water 455 captured from the ambient air 440 by the atmospheric water harvesting material 425 to pass into the condensation chamber 405 due to heat generated from solar energy 460 impinging on the light-admitting upper surface 410 of the condensation chamber 405. As illustrated, the condensation chamber 405 includes a sloped water collector 465 for moving collected water to the water outlet 415. Further, the light-admitting surface 410 of the condensation chamber 405 should be made of a material that has minimal effect on the incoming solar energy 460, such as, for example, quartz.

The atmospheric water harvesting chamber 420 comprises a cylinder 470 having an outer surface on which the atmospheric water harvesting material 425 is arranged. The atmospheric water harvesting chamber 420 also includes a frame 475 surrounding the cylinder 470. The cylinder 470 includes a spindle 480 to which a motor (not illustrated) is attached. It should be recognized that the atmospheric water harvesting device 400 can include elements in addition to those that are illustrated, such as bearings on the spindle, washers, bolts, nuts, etc.

The cylinder 470 can be comprised of a material, such as acrylic. The interior of the cylinder 470 can be empty or can be filled. The side surfaces of the cylinder (i.e., the surface visible in FIG. 4) can include holes. Thus, when there is solar energy 460 impinging upon the cylinder 470, the upper part of the cylinder 470 will be warmer than the lower part. Due to heating of the atmospheric water harvesting material 425 with the aid of the photothermal agent, water vapor is released from the cylinder 470 into the condensation chamber 405. The water vapor will attach to the upper surface 410 and/or the side walls of the condensation chamber and water droplets will fall onto sloped water collector 465 and exit the condensation chamber 405 via the water outlet 415. At the same time, the atmospheric water harvesting material 425 in the lower part of the cylinder 470 will not be heated enough to release water vapor, and thus will continue to absorb water vapor from the atmosphere. In order to assist with the condensation of the water vapor, the side walls of the condensation chamber 405 can be made of metal, such as copper.

Thus, as will be appreciated, the motor spins the cylinder 470 so that the atmospheric water harvesting material 425 in the upper part, from which water vapor has been released, is rotated to face the bottom surface 430 of the atmospheric water harvesting chamber 420 so that it can absorb water vapor from the ambient air 440 and the atmospheric water harvesting material 425 in the lower part, which has absorbed water vapor from the ambient air 440, is rotated so that it faces the opening 450 in the atmospheric water harvesting chamber 420 so that it can be exposed to the solar energy 460 and heated to release the absorbed water vapor into the condensation chamber 405.

By attached a motor to the cylinder 470, the atmospheric water harvesting device 400 can be continuously operated so that it can continuously absorb water vapor from the ambient air 440 and discharge water vapor into the condensation chamber 405. The cylinder 470 can be rotated at a speed of, for example, 00.5, 0.75, 1.5, or 4 revolutions per hour. This is particularly advantageous because water vapor can be continuously absorbed and desorbed without further human intervention, thus making it practical for a number of implementations outside of a pure industrial implementation, such as in residential use.

Figure 5:
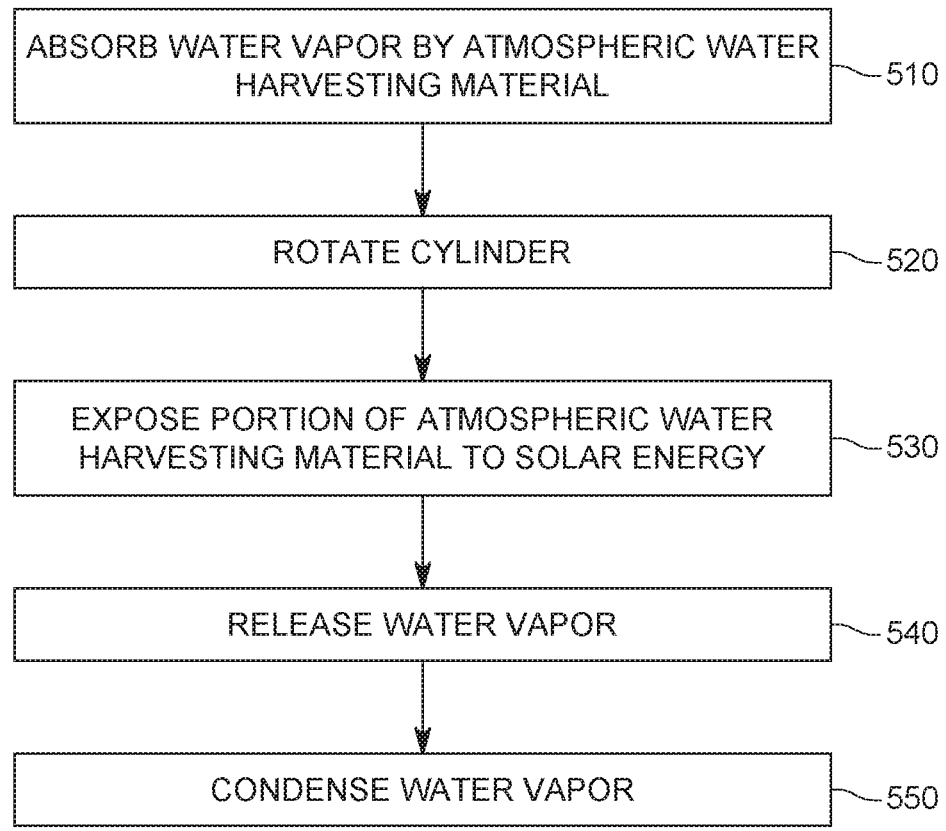
FIG. 5 is a flow diagram of a method of generating water from water vapor according to embodiments.

A method for generating water from water vapor using the atmospheric water harvesting device 400 illustrated in FIG. 4 will now be described in connection with the flow diagram of FIG. 5. Initially, water vapor is absorbed by the atmospheric water harvesting material 425 arranged on an outer surface of a cylinder 470 (step 510). The atmospheric water harvesting material 425 comprises a deliquescent salt 110, a photothermal agent 120, and a polymeric hydrogel matrix 130 containing the deliquescent salt 110 and photothermal agent 120. The cylinder 470 is rotated so that a portion of the atmospheric water harvesting material 425 that has absorbed the water vapor is facing a condensation chamber 405, which is arranged above the cylinder 470 and has a light-admitting upper surface 410 (step 520). The portion of the atmospheric water harvesting material 425 facing the condensation chamber 405 is exposed to solar energy passing through the light-admitting upper surface 410 (step 530). The solar energy causes the water vapor to be released from the portion of the atmospheric water harvesting material 425 facing the condensation chamber 405 into the condensation chamber 405 (step 540). The released water vapor is condensed into water in the condensation chamber 405 (step 550). The condensed water is pure water or the water vapor is released exclusively due to the solar energy.

When the portion of the atmospheric water harvesting material 425 is facing a condensation chamber 405 a second portion of the atmospheric water harvesting material 425 is not directly exposed to the solar energy and the second portion of the atmospheric water harvesting material absorbs water vapor. Accordingly, the atmospheric water harvesting device 400 can be continuously operated so that it can continuously absorb water vapor from the ambient air 440 and discharge water vapor into the condensation chamber 405. Further, the atmospheric water harvesting material does not change phase from hydrophilic to hydrophobic while releasing the water vapor.

A number of experiments were conducted on the atmospheric water harvesting material comprising the poly(acrylamide)-carbon nanotube-calcium chloride hydrogel (hereinafter "PAM-CNT-$CaCl_2$) hydrogel"), as well as a poly(acrylamide)-carbon nanotube hydrogel (hereinafter "PAM-CNT hydrogel"), poly(acrylamide)-calcium chloride hydrogel (hereinafter "PAM-$CaCl_2$) hydrogel"), and a poly(acrylamide) hydrogel (hereinafter "PAM hydrogel").

With regard to composition of the atmospheric water harvesting material, experiments were conducted with different concentrations of carbon nanotubes (i.e., with 2.5, 1.25, 0.5, 0.375, 0.25, 0.125, 0.05, and 0.025 mg) and with different concentrations of calcium chloride (i.e., 0.1, 0.2, 0.3, 0.4, 0.5, and 0.6 g/mL). The experiments demonstrated that the structure rigidity of the hydrogel is strongly dependent on the amount of the polymer in the hydrogel, which can be modulated by changing the amount of acrylamide monomer in the synthesis process. The amount of the acrylamide monomer precursor was optimized to be 20 wt % based on the following facts and the cost consideration. First, the acrylamide monomer of 20 wt % is the threshold at which the PAM hydrogel exhibits a standalone solid form and has a sufficient structural stability. If the acrylamide monomer concentration is lower than 20%, the product is sticky and thick liquid-like. Second, increasing acrylamide monomer concentration to above 20 wt % does not lead to any noticeable benefit of enhanced water sorption and release.

Because the atmospheric water harvesting material is designed to release water by being exposed to solar energy, the light absorbance of the PAM hydrogel without carbon nanotubes and with carbon nanotubes were evaluated. The PAM hydrogel without carbon nanotubes strongly absorbs near-infrared light at wavelength above 1400 nm, which is due to the light absorption by the water molecules inside the hydrogel. Adding the carbon nanotubes increased the light absorption from 240 to 1400 nm. Experiments demonstrated that a small amount of carbon nanotubes in the hydrogel (i.e., at a ppm level) leads to a large increase in light absorbance. Experiments demonstrated that 99% of the incident light was absorbed when the carbon nanotube loading amount was only 0.083 wt ‰. In one embodiment, the carbon nanotube loading in the PAM hydrogel can be set to be 0.42‰, where almost 100% of the incident light will be absorbed.

The water vapor sorption behavior of the calcium chloride was evaluated both by itself and when incorporated into the PAM-CNT hydrogel. The experiments demonstrated that the white solid salt was fully liquidized to a colorless transparent solution after the calcium chloride salt was exposed in 60% relative humidity conditions and that after water sorption, the PAM-CNT-CaCl$_2$ hydrogel significantly expanded but still in a solid form like a soft rubber.

The water sorption behaviors of the PAM-CNT-CaCl$_2$ hydrogel was investigated and compared under dynamic and static humidity scenarios. A constant temperature of 25° C. was set and kept throughout the water sorption process for all samples. A temperature of 25° C. was selected because it is a typical in arid areas at night when water vapor sorption takes place. All samples for water sorption assessment were first dried prior testing. In the dynamic scenario, the hydrogels were kept in a flow with a step-wise increasing humidity for certain period of time and in the static scenario the relative humidity was unchanged throughout the water sorption process.

The dynamic relative humidity test was first applied to PAM hydrogels and PAM-CNT hydrogels. Both exhibited a similar water sorption characteristic, with the water vapor sorption slightly higher for the dried PAM hydrogel than for the dried PAM-CNT hydrogel in the low humidity range (<40%) and no obvious difference in high relative humidity range. However, there was no significant difference in high humidity range. The static relative humidity test indicated that the PAM hydrogel and the PAM-CNT hydrogel both gradually approached water uptake value near to its saturation capacity within 400 min, and the final weight change due to water sorption are 32 wt % and 38 wt % water in 80% relative humidity, respectively.

Further relative humidity experiments were performed using a PAM-CaCl$_2$) hydrogel and a PAM-CNT-CaCl$_2$) hydrogel. Both of these exhibited a similar relative humidity-dependent water vapor sorption trend in dynamic water sorption measurement. Specifically, for both, the water sorption started at a very low humidity of 5%, and then gradually increased with the increase of humidity, with much higher water sorption amounts than the hydrogels without calcium chloride loading under otherwise the same condition. With a relative humidity of 10, 35, 60 and 80%, the water sorption amounts at the end of the experiment were respectively 6, 72, 116, 203% for the PAM-CaCl$_2$) hydrogel, and were respectively 5, 69, 110, 173% for the PAM-CNT-CaCl$_2$) hydrogel. The amount of water sorbed by the PAM-CaCl$_2$) hydrogel and the PAM-CNT-CaCl$_2$) hydrogel at 80% humidity were 6.3 and 4.5 times the weight of the respective hydrogels before loading with calcium chloride, which clearly demonstrates the effectiveness of calcium chloride in water sorption.

The water sorption property of the hydrogels with calcium chloride loading is very similar to that of pure calcium chloride crystal, with only slight difference in specific sorption amount, indicating that calcium chloride is primarily responsible for the water sorption of PAM-CNT-CaCl$_2$) hydrogel. Because the phase diagram of water-calcium chloride has been well studied and can be easily found in literature, it is believed that this can be used to explain the water sorption behavior of the disclosed PAM-CNT-CaCl$_2$) hydrogel. The calcium chloride contains two primary stages in connection with the water sorption process. In the first stage, anhydrous calcium chloride crystal captures water molecules through hydration reaction and forms hydrates. After the calcium chloride sorbs enough water and forms CaCl$_2$.6H$_2$O, it is then dissolved in the sorbed water as more water is sorbed. The vapor pressure of a saturated calcium chloride aqueous solution at 25° C. is 0.9 kPa, equivalent to a humidity of 26%. In other words, the water sorption by calcium chloride at a relative humidity less than 26% is attributed to its increase of the hydration water, and that occurring at a relative humidity greater than 26% leads to a dilution of the calcium chloride aqueous solution, i.e., deliquescence. It should be noted that the value 26% relative humidity value as a critical point can be varied with the ambient temperature.

Theoretically, the water sorption amount in the first stage for pure anhydrous calcium chloride is 97% ending as CaCl$_2$.6H$_2$O. However, the last two water crystals are difficult to remove at a temperature lower than 160° C. In the experiments, the samples were pre-dried at 80° C. because this is a reasonable temperature that can be achieved by photothermal heating under regular and non-concentrated sunlight. Consequently, after drying process at 80° C., the calcium chloride in the disclosed PAM-CNT-CaCl$_2$ hydrogel was mainly a mixture of CaCl$_2$.4H$_2$O and CaCl$_2$.2H$_2$O, which was confirmed by x-ray diffraction analysis and phase diagram. Because, in the experiments, 4 grams of calcium chloride was loaded into 1 gram of PAM-CNT hydrogel (4/5 of overall weight), the loading ratio of calcium chloride was 80%. The overall weight change contributed by hydration reaction should be insignificant during water sorption process, i.e., less than 30%, which is small portion of the final water sorption amount. This analysis indicates that most of the water sorption for the hydrogel material is contributed by deliquesce of the calcium chloride aqueous solution. The amount of water sorbed during deliquescent stage is highly dependent on humidity of the surroundings. Therefore, the sorption continuously increases with the increase of humidity, which gives calcium chloride a broad sorption window.

Derivative weight change based on the results obtained from the static relative humidity test was employed to investigate the water sorption kinetics of calcium chloride, PAM-CaCl$_2$) hydrogel, and PAM-CNT-CaCl$_2$) hydrogel. All three samples exhibited a small sorption rate at a relative humidity of 10% in the first 200 mins, and the sorption rate quickly decreases to near zero after 200 min, implying a quick but small water uptake at a relative humidity of 10%. When the relative humidity was less than 10%, PAM-CaCl$_2$) hydrogel and a PAM-CNT-CaCl$_2$) hydrogel share similar sorption trends to that of calcium chloride, but with much higher sorption rates, which might be due to the porous structure of the hydrogels. During the period of the static relative humidity test (i.e., 1,000 min), the PAM-CaCl$_2$) hydrogel and the PAM-CNT-CaCl$_2$) hydrogel reached their saturation states at the definite relative humidity of 10, 35 and 60%, indicated by their sorption rate at the end of the test being quite close to zero. However, at a relative humidity of 35, 60 and 80%, pristine calcium chloride salt failed to reach its saturation state within 1,000 min, which might be attributed to its liquid characteristic after deliquescence. Presumably, water sorption only occurs and is controlled by boundary layer at the air on the calcium chloride solution interface.

By comparing the results of three batches of the samples all together, the following conclusions can be made: (1) the water sorption performance of PAM-CaCl$_2$) hydrogel and PAM-CNT-CaCl$_2$) hydrogel are mainly contributed by calcium chloride; (2) the hydrogel substrate does not suppress the overall water sorption performance; and (3) the hydrogel platform not only provides physical stability of the atmospheric water harvesting device but also enhances the water sorption kinetics, leading to a faster vapor sorption rate than pristine calcium chloride salt.

In an atmospheric water harvesting device, water is released under the help of sunlight via photothermal effect to increase the temperature of the sorbent. Accordingly, the water release performance of the hydrogels was investigated using a simulated sunlight source in lab. PAM-CaCl$_2$)

hydrogel and PAM-CNT-CaCl$_2$) hydrogel samples were first stored at room temperature in air with a relative humidity of 60% for 36 hours to ensure a full water sorption. The water content of these two water-saturated hydrogels was 53.7% for the PAM-CaCl$_2$) hydrogel and 54.5% for the PAM-CNT-CaCl$_2$) hydrogel. 5.0 g of the water-saturated hydrogels were exposed under a simulated sunlight with an intensity of 1 kW/m$^2$ for water releasing. The surface temperature of the PAM-CaCl$_2$) hydrogel only increased to 35° C. under the light illumination for 50 mins, and then slowly increased to approximately 42° C. after 275 mins. The temperature increase is mainly attributed to the light sorption by water in this case, as discussed above. The surface temperature of the hydrogel is determined by its energy balance. In the initial stage of 50 mins light illumination, there was a relatively fast water release, which takes away a large amount of heat and thus leads to a low temperature of the hydrogel. The water evaporation rate then gradually decreases because the salt concentration in the residual water inside the hydrogel keeps increasing during this process due to the loss of water. As a result, the heat consumption by the water evaporation decreases, moving the balance to a higher equilibrium temperature. At the end of the experiment, the temperature of the PAM-CaCl$_2$ hydrogel reached 42° C. and 25% of the total weight of the hydrogel was lost to the released water. This suggests that only less than half of the water inside the PAM-CaCl$_2$ hydrogel was able to be released.

Regarding the disclosed PAM-CNT-CaCl$_2$ hydrogel, its surface temperature jumped to 50° C. initially at 25 mins, which is 15° C. higher than that of the PAM-CaCl$_2$ hydrogel. This comparison convincingly demonstrates the great photothermal effect of the carbon nanotubes in the hydrogel. It should be noted that, due to its higher temperature, the PAM-CNT-CaCl$_2$ hydrogel had a much higher evaporation rate than the PAM-CaCl$_2$ hydrogel. The water evaporation rate then gradually decreased along with the increase of the surface temperature. The temperature recorded in the end was 75° C. and the weight change % was ~53% at the end of 270 min for the PAM-CNT-CaCl$_2$ hydrogel, indicating almost all (>97%) sorbed water inside the PAM-CNT-CaCl$_2$ hydrogel was released. With most of the available water being released from the hydrogel, the heat loss via convection, radiation, and conduction are the major energy consumption to balance the constant solar input, and therefore the hydrogel temperature profile exhibits a plateau in the last stage from 180 min to 270 min.

The temperature and weight variation time course of the PAM-CNT-CaCl$_2$ hydrogel irradiated with simulated sunlight with varied light intensity was also evaluated. The temperature observed at 270 min under 0.6, 0.8 and 1.0 kW/m2 sunlight illumination was 55, 66 and 75° C., respectively. The corresponding weight change of the samples was 44, 49 and 53%, respectively, corresponding to 80, 89 and 97% release of the sorbed water. This demonstrates that most of the sorbed water can still be efficiently released under weakened sunlight. These photothermal-assisted water release experiments indicate that the disclosed PAM-CNT-CaCl$_2$ hydrogel has a great potential as an efficient atmospheric water harvesting device working within a wide range of relative humidity and sunlight conditions.

A cycling test was performed to evaluate the stability of the disclosed PAM-CNT-CaCl$_2$ hydrogel. Water sorption was conducted by letting 2.5 g of the dried hydrogel sit in an open air with a relative humidity of 60% at 22° C. for 36 hours in the dark, followed by one sun irradiation for 5 hours. The whole cycle was repeated for 10 times. This experiment showed that the water sorption and release performances of the PAM-CNT-CaCl$_2$ hydrogel exhibited no degradation after 10 cycles, indicating its long-term operational stability.

In conclusion, the disclosed PAM-CNT-CaCl$_2$ hydrogel possesses outstanding water sorption capability, which is similar to calcium chloride, and its flexible solid form makes it an effective atmospheric water harvesting device. Due to the fact that the working relative humidity range of the disclosed PAM-CNT-CaCl$_2$) hydrogel covers most of arid deserts, almost all islands, and inland remote regions, the atmospheric water harvesting device based on the hydrogel are low cost, versatile, deployable, and thus suitable for delivering much needed fresh water therein. Additionally, the disclosed PAM-CNT-CaCl$_2$) hydrogel only requires solar energy to release the captured water vapor and the released water is pure water that does not contain hygroscopic or other impurities.

The disclosed embodiments provide an atmospheric water harvesting material, method of producing an atmospheric water harvesting material, and an atmospheric water harvesting device. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

CITED DOCUMENTS

[1] Yang et al., Development of Solid Super Desiccants Based on a Polymeric Superabsorbent Hydrogel Composite, RSC Adv., 2015, 5, 59583-59590.
[2] Cui et al., Fast Superabsorbent Thermo-Responsive Hydrogel Composite Desiccant with Low Regeneration Temperature (2018).

What is claimed is:
1. An atmospheric water harvesting material, comprising:
   a deliquescent salt;
   a photothermal agent; and
   a polymeric hydrogel matrix containing the deliquescent salt and photothermal agent.
2. The atmospheric water harvesting material of claim 1, wherein the deliquescent salt is in a liquid phase but held in a solid form in the polymeric hydrogel matrix.
3. The atmospheric water harvesting material of claim 1, wherein the deliquescent salt is a chloride salt or a nitrate salt.

4. The atmospheric water harvesting material of claim 3, wherein the deliquescent salt is a chloride salt comprising lithium chloride, LiCl, calcium chloride, $CaCl_2$, magnesium chloride, $MgCl_2$, zinc chloride, $ZnCl_2$, iron (III) chloride, $FeCl_3$, or zinc nitrate, $Zn(NO_3)_2$.

5. The atmospheric water harvesting material of claim 3, wherein the deliquescent salt is a nitrate salt comprising copper (II) nitrate, $Cu(NO_3)_2$, nickel (II) nitrate, $Ni(NO_3)_2$, or manganese (II) nitrate, $Mn(NO_3)_2$.

6. The atmospheric water harvesting material of claim 1, wherein the polymeric hydrogel matrix comprises at least one of the following polymers:
poly(acrylic acid), PAA;
poly(vinyl pyrrolidone), PVP;
poly(acrylamide), PAM;
poly(ethylene oxide), PEO;
poly(vinyl methyl ether), PVME;
poly(vinyl alcohol), PVA;
hydroxypropylcellulose, HPC;
hydroxyethylcellulose, HEC;
poly(2-hydroxyethyl vinyl ether), PHEVE; and
poly(N-isopropylacrylamide) PNIPAM.

7. The atmospheric water harvesting material of claim 1, wherein the photothermal agent comprises one or more of the following:
a carbon material;
a two-dimensional metal carbide;
a two-dimensional metal nitride;
phosphorus;
titanium oxide;
metal nanomaterial;
iron oxide;
a polymer; and
a metal oxide.

8. The atmospheric water harvesting material of claim 1, wherein the photothermal agent comprises one or more of the following:
carbon black;
graphite;
graphene;
graphene oxide, GO;
carbon nanotubes, CNTs;
an MXene;
black phosphorous;
black titanium oxide;
metal nanorods;
metal nanoparticles;
metal nanowire;
ferrous ferric oxide;
polypyrrole;
dopamine; and
a metal oxide.

9. The atmospheric water harvesting material of claim 1, wherein the atmospheric water harvesting material captures atmospheric water having a relative humidity in a range of 15%-100%.

10. The atmospheric water harvesting material of claim 1, wherein the polymeric hydrogel matrix comprises a cross-linked and flexible hydrogel network.

11. A method for forming an atmospheric water harvesting material, the method comprising:
forming a polymeric hydrogel matrix comprising a photothermal agent;
freeze-drying the polymeric hydrogel matrix comprising the photothermal agent; and
immersing the freeze-dried polymeric hydrogel matrix comprising the photothermal agent in a solution containing deliquescent salt to form a polymeric hydrogel matrix comprising the photothermal agent and the deliquescent salt; and
drying the polymeric hydrogel matrix comprising the photothermal agent and the deliquescent salt.

12. The method of claim 11, wherein the formation of the polymeric hydrogel matrix comprising the photothermal agent comprises:
dissolving a polymer precursor in a dispersion of the photothermal agent to form a dispersion of the polymer precursor and the photothermal agent;
eliminating dissolved oxygen in the dispersion of the polymer precursor and the photothermal agent; and
adding a hydrogelling initiator and a hydrogelling agent to the dispersion of the polymer precursor and the photothermal agent.

13. The method of claim 12, further comprising:
adding a hydrogelling accelerator to the composition of the polymer precursor, photothermal agent, hydrogelling initiator, and hydrogelling agent.

14. The method of claim 12, wherein the elimination of dissolved oxygen comprises:
purging the dispersion of the polymer precursor and the photothermal agent with nitrogen.

15. A method for generating water from water vapor, the method comprising:
absorbing water vapor by an atmospheric water harvesting material arranged on an outer surface of a cylinder, wherein the atmospheric water harvesting material comprises a deliquescent salt, a photothermal agent, and a polymeric hydrogel matrix containing the deliquescent salt and photothermal agent;
rotating the cylinder so that a portion of the atmospheric water harvesting material that has absorbed the water vapor is facing a condensation chamber, which is arranged above the cylinder and has a light-admitting upper surface;
exposing the portion of the atmospheric water harvesting material facing the condensation chamber to solar energy passing through the light-admitting upper surface;
releasing, due to the solar energy, the water vapor from the portion of the atmospheric water harvesting material facing the condensation chamber into the condensation chamber; and
condensing in the condensation chamber, the released water vapor into water,
wherein the condensed water is pure water or the water vapor is released exclusively due to the solar energy.

16. The method of claim 15, wherein when the portion of the atmospheric water harvesting material is facing the condensation chamber, a second portion of the atmospheric water harvesting material is not directly exposed to the solar energy, the method further comprising: absorbing water vapor by the second portion of the atmospheric water harvesting material.

17. The method of claim 15, wherein the atmospheric water harvesting material does not change phase from hydrophilic to hydrophobic while releasing the water vapor.

18. The method of claim 15, wherein the condensed water is pure water.

19. The method of claim 15, wherein the water vapor is released exclusively due to the solar energy.

* * * * *